(12) United States Patent
Katsuma

(10) Patent No.: US 6,962,389 B2
(45) Date of Patent: Nov. 8, 2005

(54) VEHICLE BODY STRUCTURE

(75) Inventor: Daisuke Katsuma, Hiratsuka (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 32 days.

(21) Appl. No.: 10/817,794

(22) Filed: Apr. 6, 2004

(65) Prior Publication Data

US 2004/0212222 A1   Oct. 28, 2004

(30) Foreign Application Priority Data

Apr. 22, 2003  (JP) .......................... P 2003-117174

(51) Int. Cl.⁷ ............................................ B60R 27/00
(52) U.S. Cl. .......................... 296/187.12; 296/193.05; 296/193.06; 296/210
(58) Field of Search ............... 296/187.09, 187.12, 296/193.01, 193.05, 193.06, 210

(56) References Cited

U.S. PATENT DOCUMENTS

| | | | | |
|---|---|---|---|---|
| 4,883,310 A | * | 11/1989 | Miyazaki et al. | ........... 296/210 |
| 5,018,781 A | * | 5/1991 | Kumasaka et al. | ......... 296/210 |
| 5,671,968 A | * | 9/1997 | Masuda et al. | ........ 296/187.12 |
| 6,254,174 B1 | * | 7/2001 | Wee | ...................... 296/193.06 |
| 6,447,052 B2 | * | 9/2002 | Saeki | ..................... 296/187.09 |
| 6,789,840 B2 | * | 9/2004 | Honma et al. | ......... 296/187.12 |
| 6,817,654 B2 | * | 11/2004 | Kitagawa et al. | ...... 296/187.12 |

FOREIGN PATENT DOCUMENTS

JP          2001-328560        11/2001

* cited by examiner

Primary Examiner—Lori L. Coletta
(74) Attorney, Agent, or Firm—McDermott Will & Emery LLP

(57) ABSTRACT

A vehicle body structure of the present invention comprises a front pillar including a front pillar inner and a front pillar outer and provided in an up and down direction of a vehicle body, a front roof rail provided in an upper portion of the front pillar and extended in a lateral direction of the vehicle body, and a joint member provided between the front roof rail and the front pillar inner and jointing the front roof rail and the front pillar inner. In the vehicle body structure, a joint portion other than a joint portion of the joint member and a side edge portion at a body center side of the front pillar inner is configured to provide weaker joint, with respect to a load applied to the vehicle body obliquely from above, than joint provided by a joint portion of the joint member and the front roof rail. Thereby, the concentration of stress corresponding to the load can be avoided.

3 Claims, 3 Drawing Sheets

VEHICLE BODY STRUCTURE

BACKGROUND OF THE INVENTION

1. Field of the Invention

The present invention relates to a vehicle body structure and, more particularly, to a vehicle body structure at an upper area of a front pillar where the front pillar, a front roof rail and a side roof rail are joined together.

2. Description of the Related Art

In a vehicle body structure having front pillars provided at the front of a vehicle compartment in an up and down direction, a front roof rail provided above the front pillars and extended in the lateral direction of the vehicle body, and side roof rails provided so as to be extended from upper ends of the front pillars toward the rear of the vehicle body, these front pillars, front roof rail and side roof rails are joined together at the front of the vehicle compartment.

As such a vehicle body structure, the technique disclosed in the Japanese Patent Application Laid-Open No. 2001-328560 can be cited. A front pillar in this gazette is configured in such a manner that side edges of a front pillar inner and side edges of a front pillar outer are joined together. Moreover, lower edges of the front pillars are joined to front edges of side sills provided at sides of the vehicle body in the longitudinal direction thereof.

SUMMARY OF THE INVENTION

In the vehicle body structure in the above-mentioned gazette, however, a cross-section of the front pillar inner is formed into a hat-like shape, and the front pillar inner itself is formed substantially into a T-shape at a joint portion of the front pillar inner and the front roof rail. Accordingly, a joint portion constituted by the front pillar, the front roof rail and the side roof rail does not have a structure with a completely closed cross-section. In other words, the joint portion of the front pillar, the front roof rail and the side roof rail has a structure with continuous open cross-sections.

When a load is applied to the joint portion of such a structure to the vehicle body obliquely from above, this load acts as a bending load relative to an axis in the longitudinal direction of the vehicle body, and stress is concentrated in the joint portion of the front pillar inner and front roof rail. That is, since the joint portion of the front pillar inner and the front roof rail has a plate thickness larger than the other areas, stress corresponding to the load is easily concentrated in this portion.

Moreover, the joint portion of the front pillar inner and the front roof rail is configured to serve as a part of a windshield holding portion. Therefore, when bending deformation attributable to the above-mentioned stress occurs in this joint portion at an initial stage of the load application, the windshield may be broken because of the bending deformation.

The present invention was made in consideration of the above-described problems. An object of the present invention is to provide a vehicle body structure which can avoid the concentration of stress corresponding to the load in a joint portion of a front pillar inner and a front roof rail and thus can prevent the windshield from breaking, when a load is applied to a body obliquely from above.

According to one aspect of the present invention, there is provided a vehicle body structure comprising: a front pillar including a front pillar inner and a front pillar outer, the front pillar being provided in an up and down direction of a vehicle body; a front roof rail being provided in an upper portion of the front pillar, the front roof rail being extended in a lateral direction of the vehicle body; and a joint member being provided between the front roof rail and the front pillar inner, the joint member jointing the front roof rail and the front pillar inner, wherein, among joint portions of the joint member and the front pillar inner, a joint portion other than a joint portion of the joint member and a side edge portion at a body center side of the front pillar inner is configured to provide weaker joint, with respect to a load applied to the vehicle body obliquely from above, than joint provided by a joint portion of the joint member and the front roof rail.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

FIGS. 1 to 4 show an embodiment of a vehicle body structure according to the present invention. In FIGS. 1 to 4, although only a left-hand portion of a body is shown for convenience, a right-hand portion thereof is similarly configured. Note that, in FIGS. 1 and 2, the longitudinal direction of the vehicle body is indicated by an X direction, and the lateral direction thereof is indicated by a Y direction.

Figure 1:
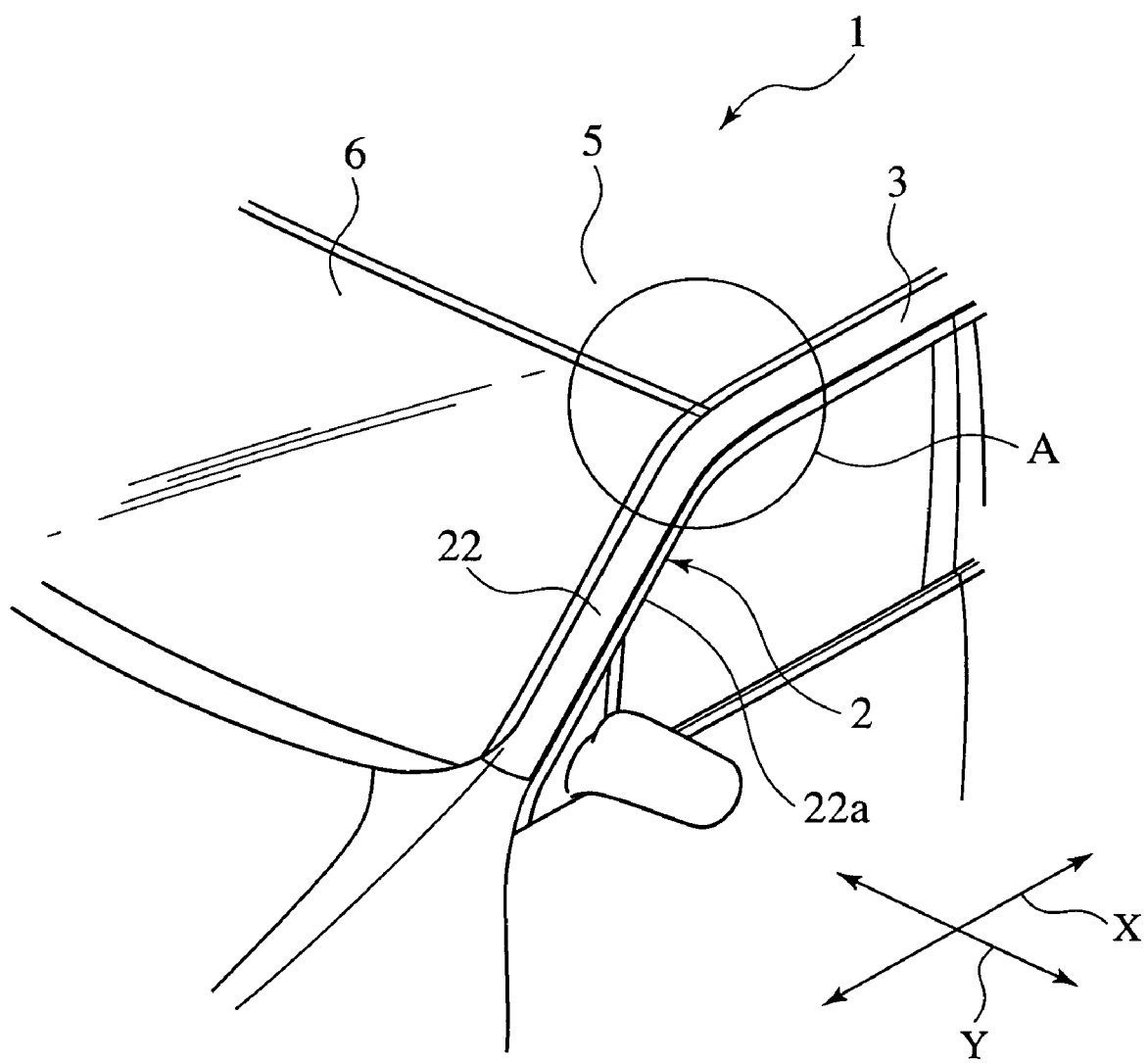
FIG. 1 is a perspective view showing a schematic configuration of a vehicle body structure according to an embodiment of the present invention.

Referring to FIG. 1, the numeral 1 denotes a vehicle body to which the vehicle body structure of the present invention is applied. The vehicle body 1 includes a pair of front pillars 2, a pair of side roof rails 3, and a front roof rail 4. The front pillars 2 are provided at front side of a vehicle compartment in an up and down direction of the vehicle body. The side roof rails 3 are provided so as to be extended from upper end portions of the front pillars 2 toward the rear of the vehicle body. The front roof rail 4 is provided between the front pillars 2 and extended in the lateral direction (Y direction). These front pillars 2, side roof rails 3 and front roof rail 4 are joined together at joint portions A in the front of the vehicle body.

A roof panel 5 which entirely or partly covers a ceiling of the vehicle body is provided in a ceiling portion of the vehicle body 1 surrounded by the front pillars 2, the side roof rails 3 and the front roof rail 4. A windshield 6 is provided in a front portion of the vehicle body 1 surrounded by the front pillars 2 and the front roof rail 4.

Figure 2:
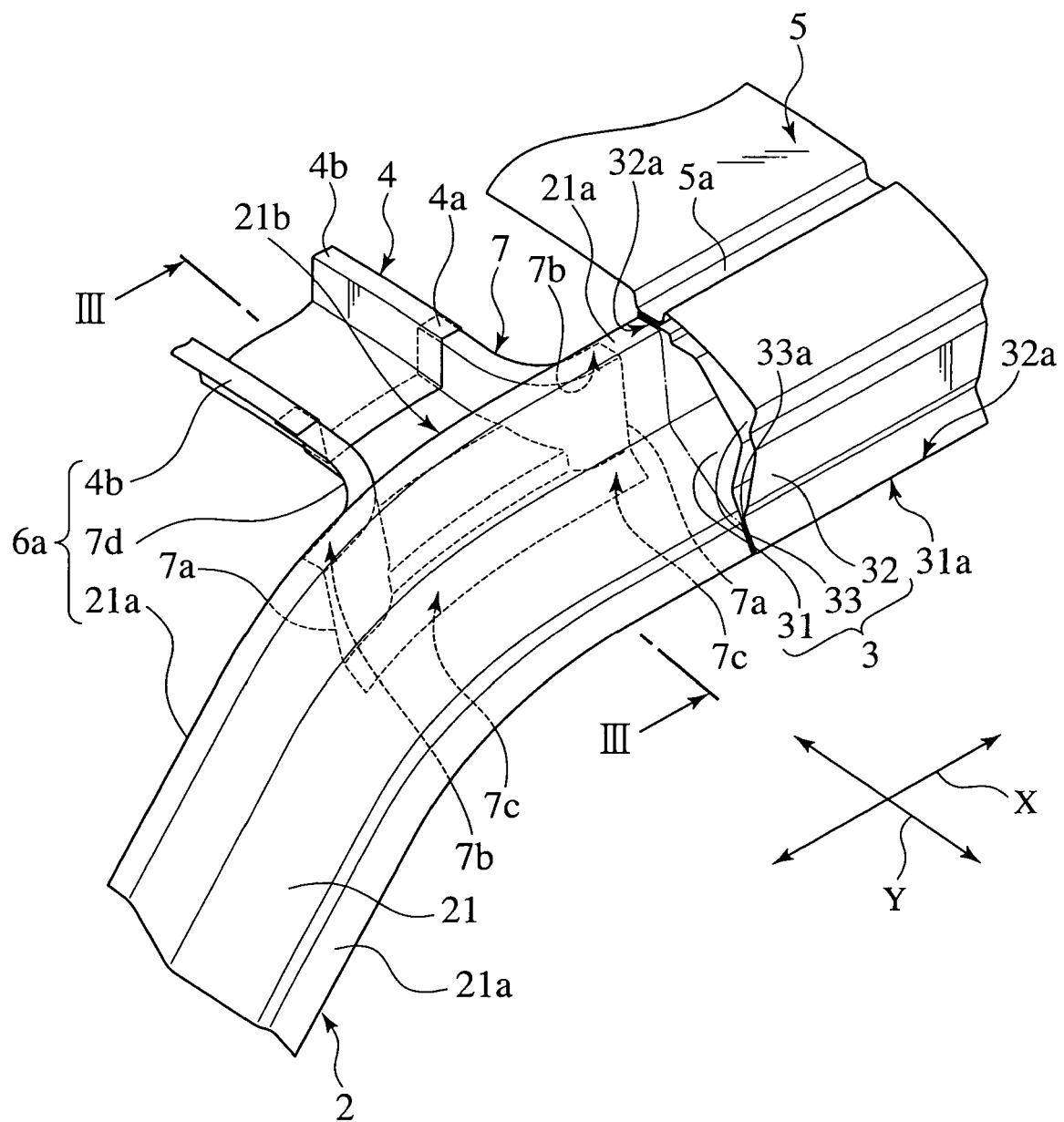
FIG. 2 is a perspective view showing essential part of the vehicle body structure according to the embodiment of the present invention.
Figure 3:
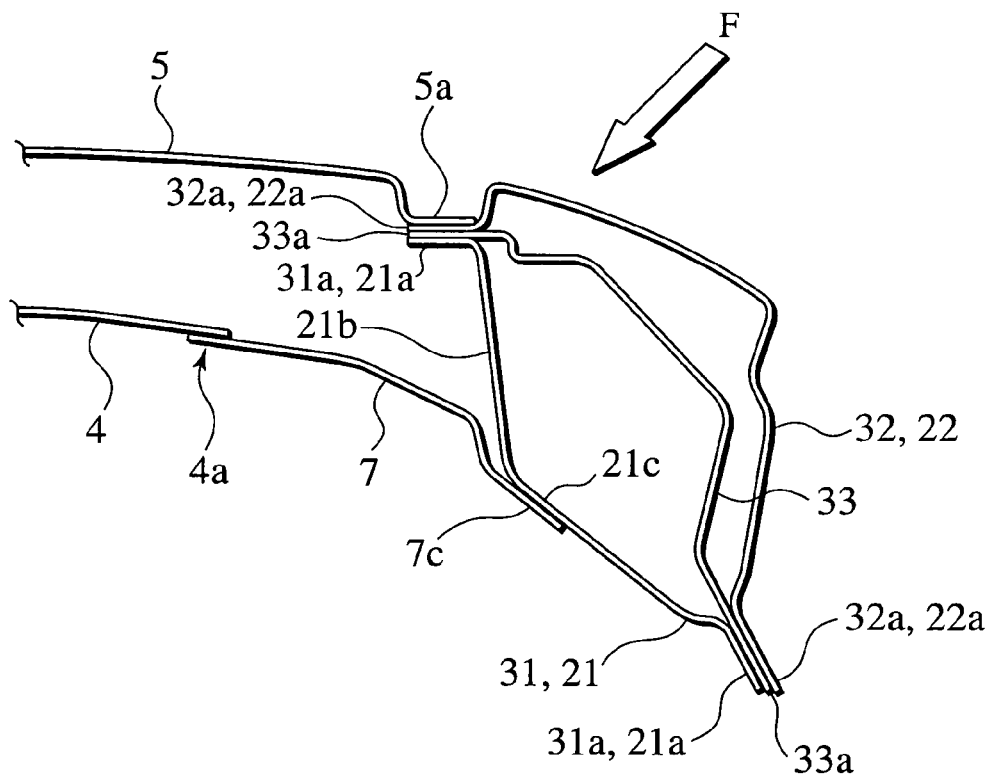
FIG. 3 is a cross-sectional view taken along the line III—III in FIG. 2.

More specifically, as shown in FIGS. 2 and 3, each of the front pillars 2 is configured in such a manner that side edge portions 21a of a front pillar inner 21 and side edge portions 22a of a front pillar outer 22 are joined together. Moreover, lower end portions of the front pillars 2 are joined to front end portions of side sills (not shown) provided at sides of the vehicle body in the X direction.

Each of the side roof rails 3 includes a side roof rail inner 31, a body side outer 32 and a reinforce side rail outer 33. The side roof rail inner 31 and the body side outer 32 are configured in such a manner that the reinforce side rail outer 33, as a rigid reinforcement, is interposed therebetween, and respective side edge portions 31a, 32a and 33a are joined together. Moreover, front end portions of the side roof rails 3 are joined to the front pillars 2, and rear end portions of the side roof rails 3 are joined to rear pillars (not shown). Furthermore, the side edge portion 32a at the body center side of each of the body side outers 32 is joined to a side edge portion 5a of the roof panel 5.

A brace roof rail 7 is provided as a joint member of each front pillar 2 and the front roof rail 4. The brace roof rails 7 are provided in upper portions of the front pillars 2 and extended in the Y direction. The front roof rail 4 and the brace roof rails 7 are fixedly jointed to each other at joint portions 4a.

In this embodiment, the brace roof rails 7, each formed substantially into a T-shape which is oriented in the Y direction, are jointed to the respective front pillar inners 21 and to the front roof rail 4. Each of the brace roof rails 7 is formed into such a shape as to spread toward the front pillar inner 21. End portions 7a of each of the brace roof rails 7 are jointed to the vicinity of a straight portion 21b located at the body center side of the front pillar inner 21. In this way, the brace roof rails 7 joint the front roof rail 4 and the respective front pillar inners 21.

In each of joint portions of the brace roof rails 7 and the front pillar inners 21, upper sides of the end portions 7a of the brace roof rail 7 and the side edge portion 21a at the body center side of the front pillar inner 21 are jointed to each other at joint portions 7b. Moreover, lower sides of the end portions 7a of the brace roof rail 7 and a lower face 21c of the front pillar inner 21 are jointed to each other at a joint portion 7c.

The joint portion 7c of these brace roof rail 7 and front pillar inner 21 provides weaker joint, with respect to a load F applied to the vehicle body obliquely from above, than the joint provided by the joint portion 4a of the brace roof rail 7 and the front roof rail 4. Moreover, the joint portion 7c provides weaker joint, with respect to the load F, than the joint provided by the joint portions 7b.

A side edge portion 4b at a body front side of the front roof rail 4 is joined to the side edge portion 5a of the roof panel 5. Moreover, this side edge portion 4b at the body front side of the front roof rail 4, a side edge portion 7d at the body front side of the brace roof rail 7, and the side edge portion 21a at the body center side of the front pillar inner 21 constitute a holding portion 6a for holing the windshield 6.

In the vehicle body structure thus configured, when a load F is applied to the vehicle body obliquely from above as shown in FIG. 3, this load F becomes a bending load relative to an axis in the X direction, in the straight portion 21b of the front pillar inner 21. Accordingly, the load F is applied to the front pillar 2, the front roof rail 4 and the brace roof rail 7. Stress corresponding to this Load F is transmitted to the joint portions 7b and 7c of the brace roof rail 7 and the front pillar inner 21 through the straight portion 21b.

Here, as mentioned earlier, the joint portion 7c provides weaker joint than the joints provided by the joint portions 4a and 7b. Therefore, the joint portion 7c is broken and released before the joint portions 4a and 7b (see FIG. 4). At this time, since the joint portions 4a and 7b are jointed to their respective associated portions without being released therefrom, it is possible to avoid concentration of stress in the joint portion 4a. Accordingly, it is possible to suppress the occurrence of breakdown in the windshield holding portion 6a due to the concentration of the stress corresponding to the load F, and thus to prevent the windshield 6 from breaking.

Figure 4:
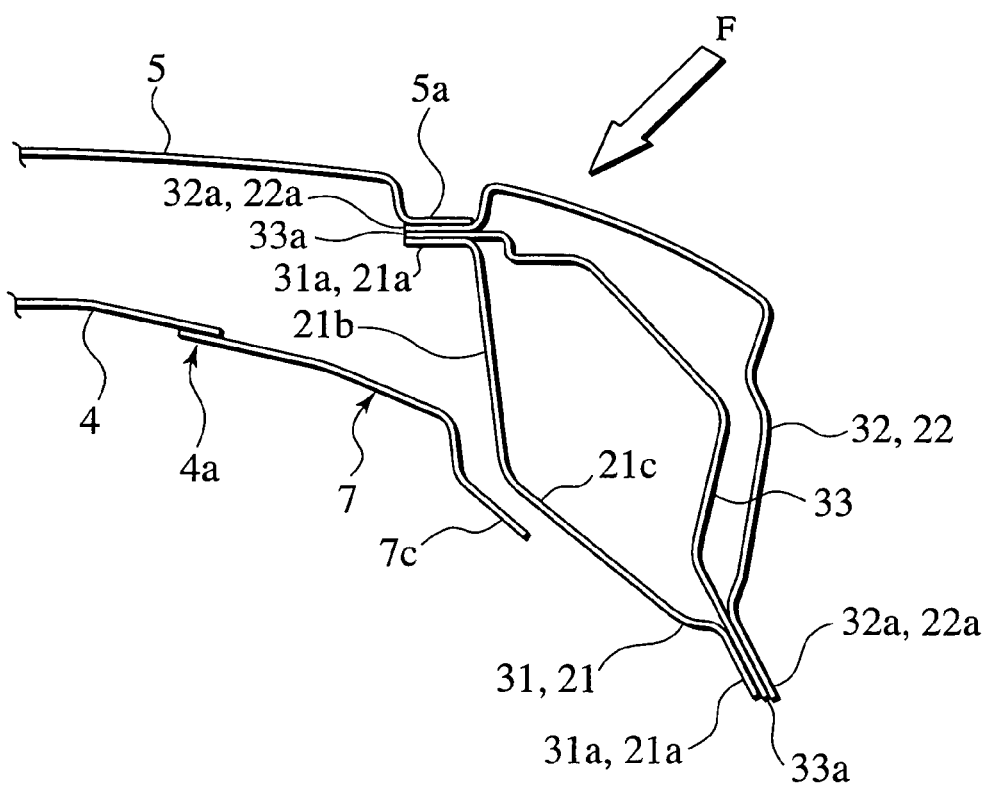
FIG. 4 is a cross-sectional view taken along the line III—III in FIG. 2, showing a state where a joint portion of a brace roof rail and a front pillar inner is broken.

In addition to the above, as shown in FIGS. 3 and 4, the front pillar outer 22 and the body side outer 32 are joined to an area, facing the front roof rail, of the side edge portion 21a at the body center side of the front pillar inner 21, with the reinforce side rail outer 33 interposed therebetween. In other words, the front pillar outer 22 and the body side outer 32 are joined to the straight portion 21b with the reinforce side rail outer 33 interposed therebetween. Moreover, the side edge portion 32a at the body center side of the body side outer 32 is joined to the side edge portion 5a of the roof panel 5. Accordingly, it is possible to form, in the X direction, a closed cross-section composed of these front pillar inner 21, front pillar outer 22, side roof rail inner 31, body side outer 32, and reinforce side rail outer 33. Therefore, it is possible to significantly increase the rigidity of the vehicle body at the joint portions A where the front pillars 2, the side roof rails 3 and the front roof rail 4 are joined together.

The entire content of a Japanese Patent Application No. P2003-117174 with a filing date of Apr. 22, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A vehicle body structure, comprising:
    a front pillar including a front pillar inner and a front pillar outer, the front pillar being provided in an up and down direction of a vehicle body;
    a front roof rail being provided in an upper portion of the front pillar, the front roof rail being extended in a lateral direction of the vehicle body; and
    a joint member being provided between the front roof rail and the front pillar inner, the joint member jointing the front roof rail and the front pillar inner,
    wherein, among joint portions of the joint member and the front pillar inner, a joint portion other than a joint portion of the joint member and a side edge portion at a body center side of the front pillar inner is configured to provide weaker joint, with respect to a load applied to the vehicle body obliquely from above, than joint provided by a joint portion of the joint member and the front roof rail.

2. The vehicle body structure of claim 1,
    wherein the joint member joints the front roof rail and a lower face of the front pillar inner, and the weak joint portion of the joint member is provided in the lower face of the front pillar inner.

3. The vehicle body structure of claim 1, further comprising:
    a body side outer being provided in such a manner as to be continued from an upper end portion of the front pillar outer, the body side outer being extended in a longitudinal direction of the vehicle body; and
    a roof panel covering entire or part of an upper portion of the vehicle body,
    wherein the front pillar outer and the body side outer are joined to an area, facing the front roof rail, of the side edge portion at the body center side of the front pillar inner, with a reinforce side rail outer interposed therebetween, and
    the roof panel is jointed to the body side outer.

* * * * *